(12) United States Patent
Shi et al.

(10) Patent No.: US 11,288,326 B2
(45) Date of Patent: Mar. 29, 2022

(54) RETRIEVAL METHOD AND DEVICE FOR JUDGMENT DOCUMENTS

(71) Applicant: BEIJING GRIDSUM TECHNOLOGY CO., LTD., Beijing (CN)

(72) Inventors: Peng Shi, Beijing (CN); Yi Li, Beijing (CN); Jian Zhao, Beijing (CN)

(73) Assignee: Beijing Gridsum Technology Co., Ltd., Beijing (CN)

( * ) Notice: Subject to any disclaimer, the term of this patent is extended or adjusted under 35 U.S.C. 154(b) by 296 days.

(21) Appl. No.: 16/331,467

(22) PCT Filed: Nov. 27, 2017

(86) PCT No.: PCT/CN2017/113044
§ 371 (c)(1),
(2) Date: Jul. 22, 2019

(87) PCT Pub. No.: WO2018/121153
PCT Pub. Date: Jul. 5, 2018

(65) Prior Publication Data
US 2019/0347294 A1    Nov. 14, 2019

(30) Foreign Application Priority Data

Dec. 29, 2016 (CN) .......................... 201611247937.4

(51) Int. Cl.
*G06F 17/30* (2006.01)
*G06F 16/908* (2019.01)
(Continued)

(52) U.S. Cl.
CPC ........ *G06F 16/908* (2019.01); *G06F 16/9027* (2019.01); *G06F 16/9038* (2019.01); *G06Q 50/18* (2013.01)

(58) Field of Classification Search
CPC .... G06F 16/334; G06F 16/953; G06F 16/316; G06F 16/35; G06F 16/9027; G06F 16/93
See application file for complete search history.

(56) References Cited

U.S. PATENT DOCUMENTS 6,212,494 B1 * 4/2001 Boguraev ............. G06F 40/289
                                                          704/9
6,236,985 B1 * 5/2001 Aggarwal ............. G06Q 40/04
(Continued)

FOREIGN PATENT DOCUMENTS

CN     101192237 A     6/2008
CN     101952826 A     1/2011
(Continued)

*Primary Examiner* — Daniel A Kuddus
(74) *Attorney, Agent, or Firm* — Gang Yu

(57) ABSTRACT

The invention discloses a retrieval method and device for judgment documents and relates to the technical field of data retrieval, mainly aiming to mark existing judgment documents with information codes and perform vertical and horizontal retrieval according to the association relation among the information codes during retrieval so as to provide more comprehensive retrieval results. The main technical scheme of the invention includes: creating information codes, wherein the information codes are atomic data structures extracted from judgment documents according to preset classification dimensions and are configured for distinguishing and associating different judgment documents; marking judgment documents in a retrieval database with the information codes; associating the judgment documents marked with the information codes according to preset association information; acquiring corresponding information codes in retrieval information; and outputting and displaying the judgment documents marked with the information codes and judgment documents associated with the judgment documents marked with the information codes as retrieval results according to the information codes. The (Continued)

invention is mainly applied for retrieving the judgment documents.

7 Claims, 4 Drawing Sheets

(51) Int. Cl.
  *G06F 16/9038* (2019.01)
  *G06F 16/901* (2019.01)
  *G06Q 50/18* (2012.01)

(56) References Cited

U.S. PATENT DOCUMENTS

| | | | | |
|---|---|---|---|---|
| 6,381,354 B1* | 4/2002 | Mennie | ............ | G07D 7/04 |
| | | | | 382/135 |
| 6,496,568 B1* | 12/2002 | Nelson | ............ | H04M 3/487 |
| | | | | 379/201.01 |
| 6,519,586 B2* | 2/2003 | Anick | ............ | G06F 16/951 |
| | | | | 707/742 |
| 7,496,568 B2* | 2/2009 | Broder | ............ | G06F 16/334 |
| 8,256,191 B2* | 9/2012 | Griggs | ............ | B65B 51/04 |
| | | | | 53/417 |
| 8,286,191 B2* | 10/2012 | Amini | ............ | G06F 9/544 |
| | | | | 719/318 |
| 9,235,638 B2* | 1/2016 | Gattiker | ............ | G06F 16/93 |
| 9,596,254 B1* | 3/2017 | Muddu | ............ | G06F 3/04847 |
| 9,609,011 B2* | 3/2017 | Muddu | ............ | G06N 5/022 |
| 9,699,205 B2* | 7/2017 | Muddu | ............ | G06F 40/134 |
| 9,996,567 B2* | 6/2018 | Smart | ............ | G06F 16/2246 |
| 2002/0032672 A1* | 3/2002 | Keith, Jr. | ............ | G06F 16/951 |
| 2003/0018622 A1* | 1/2003 | Chau | ............ | G06F 16/954 |
| 2006/0271526 A1* | 11/2006 | Charnock | ............ | G06Q 30/02 |
| 2009/0100014 A1* | 4/2009 | Gedik | ............ | G06F 16/3332 |
| 2009/0216734 A1* | 8/2009 | Aghajanyan | ............ | G06F 16/9535 |
| 2010/0293301 A1* | 11/2010 | Amini | ............ | G06F 9/544 |
| | | | | 710/12 |
| 2012/0082048 A1* | 4/2012 | Taft | ............ | H04L 67/125 |
| | | | | 370/252 |
| 2012/0327779 A1* | 12/2012 | Gell | ............ | H04L 47/623 |
| | | | | 370/238 |
| 2014/0270536 A1* | 9/2014 | Amtrup | ............ | G06K 9/00483 |
| | | | | 382/195 |
| 2016/0267082 A1* | 9/2016 | Wong | ............ | G06F 16/164 |
| 2016/0299967 A1* | 10/2016 | Gattiker | ............ | G06F 16/3335 |

FOREIGN PATENT DOCUMENTS

| | | |
|---|---|---|
| CN | 104008171 A | 8/2014 |
| CN | 104090875 A | 10/2014 |
| CN | 104281648 A | 1/2015 |
| CN | 105930473 A | 9/2016 |
| WO | WO2018/121153 A1 * | 5/2018 |

* cited by examiner

RETRIEVAL METHOD AND DEVICE FOR JUDGMENT DOCUMENTS

CROSS REFERENCE TO RELATED APPLICATIONS

The present application is a 371 of international patent application No. PCT/CN2017/113044 filed Nov. 27, 2017. This international patent application claims the benefit and priority of Chinese Patent Application No. 201611247937.4 filed Dec. 29, 2016. The entire content of the above application is incorporated herein by reference.

TECHNICAL FIELD

The invention relates to the technical field of data retrieval, and in particular to a retrieval method and device for judgment documents.

BACKGROUND ART

A judgment document for recording a trial process and result of the People's Court is a carrier of a litigation activity result and the only evidence by which the People's Court determines and distributes substantive rights and obligations of the parties. The judgment document with complete structure, intact elements and strict logic is not only an evidence for the parties to enjoy their rights and bear obligations, but also an important basis for the People's Court at a higher level to supervise civil trial activities of the People's Court at a lower level.

At present, more than 20 million judgment documents have been published on a judgment document website, providing retrieval and download of the cause of action, keywords, parties, judges, lawyers, document types, courts and other dimensions. Some relevant retrieval websites also provide retrieval and download of some judgment documents. However, an existing retrieval method basically matches retrieval keywords inputted by a searcher. Generally, the retrieval keywords used are retrieval queries according to the existing categories, such as the cause of action, parties, judges and lawyers. By comparing information elements or keywords in the judgment documents with the retrieval keywords, an obtained retrieval result is basically a direct listing of all the judgment documents that meet retrieval conditions. This retrieval method can be regarded as vertical retrieval on the judgment documents. However, this method lacks horizontal comparison or association with the retrieved judgment documents, so that the searcher may need to retrieve other keywords several times to get the required judgment document.

SUMMARY OF THE INVENTION

In view of this, the invention provides a retrieval method and device for judgment documents, mainly aiming to mark existing judgment documents with information codes and perform vertical and horizontal retrieval according to the association relation among the information codes during retrieval so as to provide more comprehensive retrieval results.

In order to achieve the purpose above, the invention mainly provides the following technical scheme:
in an aspect, the invention provides a retrieval method for judgment documents, comprising the steps of:
creating information codes, wherein the information codes are atomic data structures extracted from judgment documents according to preset classification dimensions and are configured for distinguishing and associating different judgment documents;
marking judgment documents in a retrieval database with the information codes;
associating the judgment documents marked with the information codes according to preset association information;
acquiring corresponding information codes in retrieval information; and
outputting and displaying the judgment documents marked with the information codes in the retrieval information and judgment documents associated with the judgment documents marked with the information codes as retrieval results according to the information codes in the retrieval information.

Preferably, the creating the information codes includes:
creating a dimension level tree according to the preset classification dimensions, wherein the classification dimensions are configured for classifying the judgment documents;
generating corresponding information codes in accordance with child nodes in the dimension level tree according to a structure of the dimension level tree; and
storing the information codes in a dictionary form to obtain an information code dictionary.

Preferably, the generating the corresponding information codes in accordance with the child nodes in the dimension level tree includes according to the structure of the dimension level tree:
setting a structure of the information code as {Id,CodeKeyword,CodeType,CodePath,Pid}, wherein Id is a unique identifier of the information code, CodeKeyword is a code keyword which is node information corresponding to the child node, CodeType is a dimension name, CodePath is a code path which is a branch path of the child node, and Pid is a parent node of the child node;
acquiring field information of each field corresponding to the structure of the information code for each child node; and
generating an information code corresponding to each child node layer by layer according to an order from a top layer to a bottom layer of the dimension level tree and the field information of each field in the structure of the information code corresponding to each child node.

Preferably, the storing the information codes in the dictionary form includes: the information code in the dictionary form has a key being CodeType_CodeKeyword and a value being a structure object of the information code.

Preferably, the associating the judgment documents marked with the information codes by the marking unit according to the preset association information includes:
acquiring the preset association information of the judgment documents;
searching judgment documents corresponding to other nodes in branch paths to which the code paths belong according to code paths of the information codes in the judgment documents;
acquiring associated judgment documents having the same preset association information as the judgment documents from the corresponding judgment documents; and
associating the associated judgment documents with the judgment documents.

Preferably, the marking the judgment documents in the retrieval database with the information codes includes:
parsing the judgment documents in the retrieval database according to the preset classification dimensions to obtain dimension information corresponding to the various dimensions of the judgment documents;
matching corresponding information codes according to the dimension information; and
labeling the information codes to the judgment documents.

Preferably, the associating the judgment documents marked with the information codes by the marking unit according to the preset association information includes:
acquiring the preset association information of the judgment documents;
searching the classification dimensions for the associated judgment documents having the same preset association information as the judgment documents according to the classification dimensions of the information codes in the judgment documents; and
associating the associated judgment documents with the judgment documents.

Preferably, the outputting and displaying the judgment documents marked with the information codes and judgment documents associated with the judgment documents marked with the information codes as retrieval results according to the information codes includes:
extracting the judgment documents marked with the information codes and displaying the judgment documents in a first retrieval list; and
extracting the judgment documents having the same association information as the judgment documents according to the judgment documents in the first retrieval list and displaying the judgment documents having the same association information as the judgment documents in a second retrieval list.

In another aspect, the invention provides a retrieval device for judgment documents, including:
a creating unit configured for creating information codes, wherein the information codes are atomic data structures extracted from judgment documents according to preset classification dimensions and are configured for distinguishing and associating different judgment documents;
a marking unit configured for marking judgment documents in a retrieval database with the information codes created by the creating unit;
an associating unit configured for associating the judgment documents marked with the information codes by the marking unit according to preset association information;
an acquiring unit configured for acquiring corresponding information codes in retrieval information; and
a display unit configured for outputting and displaying the judgment documents marked with the information codes and judgment documents associated with the judgment documents marked with the information codes as retrieval results according to the information codes acquired by the acquiring unit.

Preferably, the creating unit includes:
a creating module configured for creating a dimension level tree according to the preset classification dimensions, wherein the classification dimensions are configured for classifying the judgment documents;
a generating module configured for generating corresponding information codes in accordance with child nodes in the dimension level tree according to a structure of the dimension level tree created by the creating module; and
a storage module configured for storing the information codes generated by the generating module in a dictionary form to obtain an information code dictionary.

Preferably, the generating module includes:
a setting sub-module configured for setting a structure of the information code as {Id,CodeKeyword,CodeType,CodePath,Pid}, wherein Id is a unique identifier of the information code, CodeKeyword is a code keyword which is node information corresponding to the child node, CodeType is a dimension name, CodePath is a code path which is a branch path of the child node, and Pid is a parent node of the child node;
an acquiring sub-module configured for acquiring field information of each field corresponding to the structure, set by the setting sub-module, of the information code for each child node; and
a generating sub-module configured for generating an information code corresponding to each child node layer by layer according to an order from a top layer to a bottom layer of the dimension level tree and the field information, acquired by the acquiring sub-module, of each field in the structure of the information code corresponding to each child node.

Preferably, the storage module is further configured so that the information code in the dictionary form has a key being CodeType_CodeKeyword and a value being a structure object of the information code.

Preferably, the associating unit includes:
an acquiring module configured for acquiring the preset association information of the judgment documents;
a searching module configured for searching judgment documents corresponding to other nodes in branch paths to which the code paths belong according to code paths of the information codes in the judgment documents, and acquiring associated judgment documents having the same preset association information, acquired by the acquiring module, as the judgment documents from the corresponding judgment documents; and
an associating module configured for associating the associated judgment documents obtained by the searching module with the judgment documents.

Preferably, the marking unit includes:
a parsing module configured for parsing the judgment documents in the retrieval database according to the preset classification dimensions to obtain dimension information corresponding to the various dimensions of the judgment documents;
a matching module configured for matching corresponding information codes according to the dimension information obtained through parsing by the parsing module; and
a labeling module configured for labeling the information codes obtained by the matching module to the judgment documents.

Preferably, the associating unit includes:
the acquiring module further configured for acquiring the preset association information of the judgment documents;
the searching module further configured for searching the classification dimensions for the associated judgment documents having the same preset association information as the judgment documents according to the classification dimensions of the information codes in the judgment documents; and
the associating module further configured for associating the associated judgment documents with the judgment documents.

Preferably, the display unit includes:
a first display module configured for extracting the judgment documents marked with the information codes and displaying the judgment documents in a first retrieval list; and
a second display module configured for, according to the judgment documents in the first retrieval list displayed by the first display module, extracting the judgment documents having the same association information as the judgment documents and displaying the judgment documents having the same association information as the judgment documents in a second retrieval list.

According to the retrieval method and device for judgment documents provided by the invention, through association processing on the judgment documents in a judgment document base, when a user retrieves the judgment documents, the user not only can match vertical retrieval results according to input retrieval conditions, that is, the judgment documents marked with the retrieved information codes, but also obtain the judgment documents horizontally associated with the retrieval conditions, that is, the associated judgment documents at the same latitude and at different levels as the retrieved information codes, so that the retrieval results are more comprehensive, intelligence of retrieval is improved, the requirement on the retrieval capability of the user is lowered, and the user can quickly and accurately obtain the required retrieval results with simplified query conditions.

BRIEF DESCRIPTION OF THE DRAWINGS

Various other advantages and benefits will become apparent to those of ordinary skill in the art upon reading the following detailed description of the preferred embodiments. The drawings are only for purposes of illustrating preferred embodiments and not to be construed as limiting the invention. Corresponding reference characters indicate corresponding parts throughout the views of the drawings. In the drawings.

DETAILED DESCRIPTION OF THE INVENTION

Figure 1:
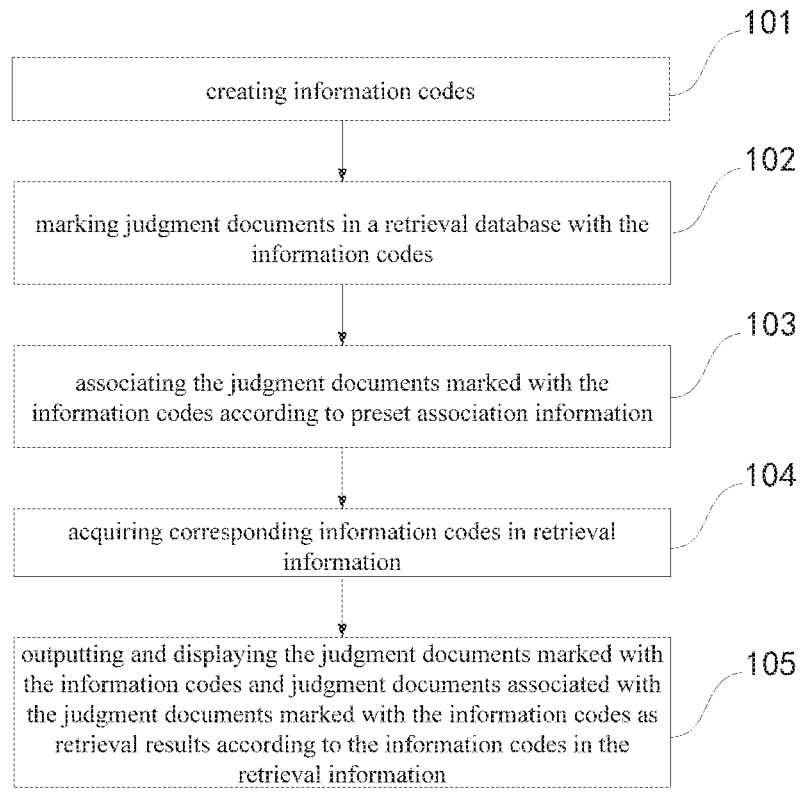
FIG. 1 shows a flow chart of a retrieval method for judgment documents provided by an embodiment of the invention.

An exemplary embodiment of the invention will now be described in detail with reference to the accompanying drawings. Although the exemplary embodiments of the invention are shown in the drawings, it should be appreciated that the invention can be realized in different forms, but should not be limited to these exemplary embodiments described herein. Rather, these embodiments are provided so that this invention will be thorough and complete, and will fully convey the scope of the invention to those skilled in the art.

An embodiment of the invention provides a retrieval method for judgment documents. As shown in FIG. 1, in the retrieval method, documents in a judgment document library are associated with one another by marking information codes before retrieval, and corresponding judgment documents and associated judgment documents are output together when a retrieval result is output through the association relation. The retrieval method specifically includes the steps of:

101. creating information codes;

this step is the preprocessing on a retrieval database for storing judgment documents before a user inputs retrieval information, wherein the information codes in various dimensions are extracted according to the preset classification dimension on the basis of the judgment documents in the retrieval database, and the information codes are atomic data structures extracted from the judgment documents according to the preset classification dimension and are configured for distinguishing and associating different judgment documents;

specifically, the preset classification dimension refers to classification in different dimensions according to a labeling format of the judgment document, for example, with regard to a judgment document, according to information recorded in its content, the judgment document can generally be classified according to different dimensions such as the cause of action, parties, judges, lawyers, document types, courts and trial levels; while in each dimension, the judgment document can also be divided into different levels according to corresponding information in different judgment documents, for example, a dimension of a trial level also includes a first instance, a second instance, a final instance and other levels; a dimension of courts also includes superior courts, intermediate courts, grass-roots courts and the like; the courts at the same level can be further distinguished, for example, the intermediate courts can also be divided into Beijing first intermediate court, Beijing second intermediate court and the like; it can be seen that the preset classification dimension can be selected according to regulations and standards, while the information codes are identification information generated according to nodes at various levels within different dimensions in the classification dimension; the identification information is the smallest classification identification; a data structure of the identification information is the atomic data structure; the information code will be determined correspondingly and cannot be detailed and divided after the classification dimension and the level in the dimension are determined; and the corresponding information code will not change unless the classification dimension or the level in the dimension is modified;

102. marking judgment documents in a retrieval database with the information codes;

each judgment document in the retrieval database is parsed according to the information codes created in the step 101, that is, the information content corresponding to each classification dimension in the judgment document is determined according to the preset classification dimension, and the level corresponding to the information content and the node corresponding in the level are parsed, and after determination, the information code corresponding to the node is marked in the judgment document;

it should be noted that when marking a judgment document with the information code, it is needed to match the preset classification dimension one by one to the judgment document, that is, the more the preset classification dimensions, the more information codes marked in a judgment document;

and in this step, since one judgment document is often marked with a plurality of information codes, and these information codes need to be used in a subsequent retrieval matching step, the judgment document could be uniformly marked with an array field including field values of different dimensions when marking the judgment document, and the matched information codes are stored in the fields of the corresponding dimensions;

103. associating the judgment documents marked with the information codes according to preset association information;

wherein the preset association information refers to common feature information extracted from different judgment documents having the same information content; for example, if two judgment documents are obtained after the first instance and second instance of a same case, information codes in the dimension of the trial level marked to the two judgment documents are different from each other, and corresponding association information for associating the two judgment documents is a case number of the case;

in this step, the first thing to be determined is the association information which is preset. The judgment documents are associated one by one in the retrieval database according to the association information, and an association relation is established between the judgment documents having the same association information;

the above three steps, including this step, are all processing operations on the judgment documents stored in the retrieval database before the user carries out the retrieval operation, wherein when updating the retrieval database, the newly added judgment documents also need to be subjected to the above operations, and the newly added judgment documents are associated with the existing judgment documents; and on this basis, simply after the information codes are created and the association relation between the judgment documents is established, can the subsequent retrieval operation namely step 104 be performed;

104. acquiring corresponding information codes in retrieval information;

after the user inputs the retrieval information, a system will match the corresponding information code according to the retrieval information; in this step, the specific implementation may be to set specific retrieval conditions in advance, with different conditions corresponding to different information codes or a combination of multiple information codes to be selected by the user as needed; and information can also be freely inputted by the user, the system parses the inputted information, and the corresponding information code is matched or a combination of multiple information codes is matched according to a parsing result;

105. outputting and displaying the judgment documents marked with the information codes and judgment documents associated with the judgment documents marked with the information codes as retrieval results according to the information codes in the retrieval information;

this step is to perform judgment document matching and result output in the retrieval database according to the information codes obtained in step 104;

during a matching process, firstly, according to the obtained information code, the judgment document with the information code is queried in the retrieval database, and the judgment document with the information code is output and displayed as a part of the retrieval results; secondly, according to the judgment documents with the information codes, all the judgment documents associated with the judgment document with the retrieved information code are extracted one by one, and the associated judgment documents are also output and displayed as the retrieval results of this retrieval; further, in order to make the user clearly understand the relation between each judgment document in the retrieval results and retrieved information, the judgment documents can be re-displayed with the association information marked thereto, such as "vertical retrieval results" or "horizontal retrieval results" in the displayed information of the judgment documents, wherein the "vertical retrieval results" indicate the judgment documents containing the retrieved information code, and the "horizontal retrieval results" indicate the judgment documents having the same association information as the judgment documents containing the retrieved information code; in addition, the judgment documents in the horizontal retrieval results can also be marked in detail with which judgment document in the "vertical retrieval results" has an association relation or with specific association information content, etc.;

in the specific output display, a preferred display method is to display the retrieval results in different lists according to different retrieval methods; for example, the judgment documents marked with the retrieved information codes are displayed in a first retrieval list; the judgment documents in the first retrieval list are the "vertical retrieval results", while the "horizontal retrieval results" are displayed in a second retrieval list; in the second retrieval list, judgment documents having the same association information as that in the first retrieval list will also be marked behind each judgment document, that is, the corresponding relation with the contents in the first retrieval list is displayed; and as can be seen from the above implementation, according to the retrieval method for judgment documents of the embodiment of the invention, through association processing on the judgment documents in a judgment document base, when a user retrieves the judgment documents, not only the vertical retrieval results can be matched according to input retrieval conditions, that is, the judgment documents marked with the retrieved information codes, but also the judgment documents horizontally associated with the retrieval conditions can be obtained, that is, the associated judgment documents at the same latitude and at different levels as the retrieved information codes, so that the retrieval results are more comprehensive, intelligence of retrieval is improved. The requirement on the retrieval capability of the user is lowered, and the user can quickly and accurately obtain the required retrieval results with simplified query conditions.

Figure 2:
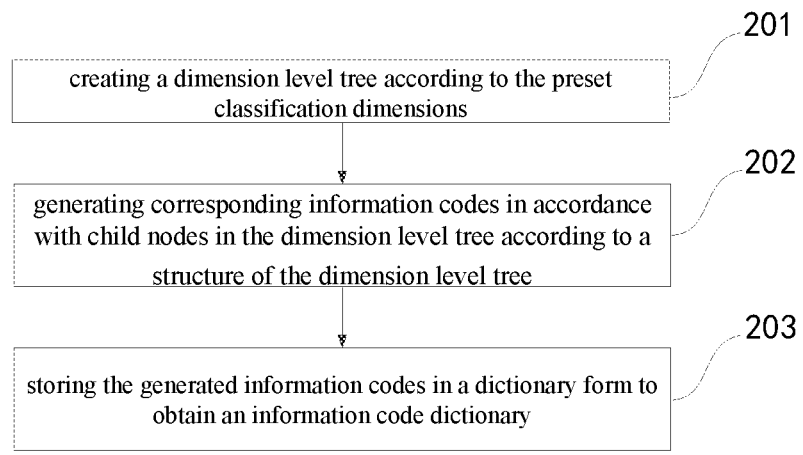
FIG. 2 shows a flow chart of creating an information code of the judgment document provided by an embodiment of the invention.
Figure 3:
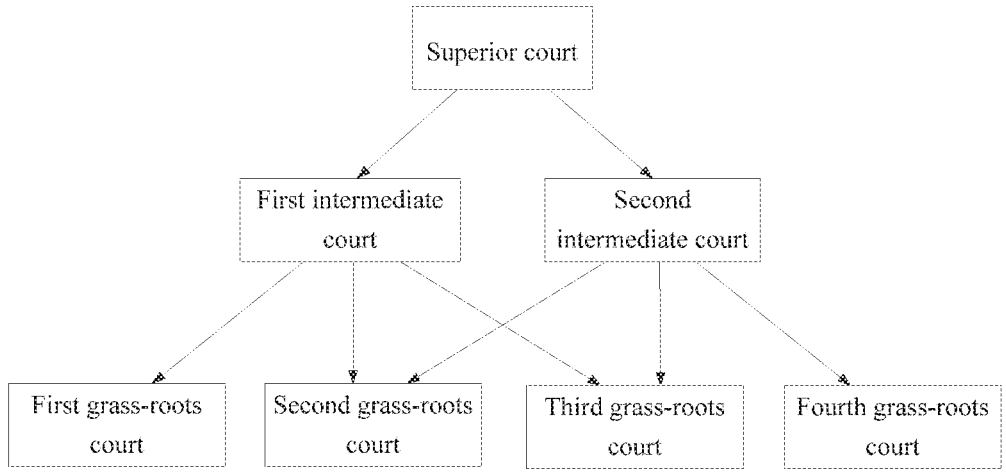
FIG. 3 shows a schematic diagram of a dimension level tree of the judgment document provided by an embodiment of the invention.

According to the retrieval method for judgment documents provided in the above embodiment, it can be seen that in order to retrieve associated judgment documents from multiple angles, it is necessary to pre-process the judgment documents in the retrieval database, and this processing mainly includes the two steps of creating information codes, and labeling the judgment documents with the information codes and associating the judgment documents. The specific implementation of these two steps in practical applications will be described separately below:

firstly, in a process if creating information codes, a specific information code generating mode is as shown in FIG. 2, including:

201. creating a dimension level tree according to the preset classification dimensions, wherein the number of the classification dimensions can be set in a user-defined manner as needed; a corresponding dimension level tree could be created for each dimension, and levels contained in each level tree and nodes in each level can be customized according to an existing classification mode; for example, a court level tree can be set to be provided with three levels, respectively a superior court, intermediate courts and grass-roots courts, wherein a root node of the court level tree is the superior court, the number of the intermediate courts belonging to the superior court is two, respectively the first intermediate court and the second intermediate court, the first intermediate court has three subordinate grass-roots courts, respectively a first grass-roots court, a second grass-roots court and a third grass-roots court, and the second intermediate court has three subordinate grass-roots courts, respectively the second grass-roots court, the third grass-roots court and a fourth grass-roots court; the court level tree thus obtained is shown in FIG. 3; while in practical application, the user can add or delete nodes in the tree according to actual needs when setting the court level tree; for example, when a third intermediate court exists, this node can be added to the intermediate court level in the tree and grass-roots courts subordinated to third intermediate court can be set accordingly, or in the absence of the fourth grass-roots court, the corresponding node in the tree can be deleted. Wherein the node where the intermediate court is located is the child node of the node where the superior courts is located. And the node where the intermediate court is located is the parent node of the node where the grass-roots courts is located. In general, the node where the high court is located is called the root node.

in this step, the structure of the dimension level tree mainly generates a standard level tree according to laws and regulations and relevant stipulations. On this basis, adjustment is carried out according to the needs of actual application, such as making differentiated settings according to different regions, or modifying the structure of the level tree according to changes of laws and regulations;

202. generating corresponding information codes in accordance with child nodes in the dimension level tree according to a structure of the dimension level tree;

firstly, setting a specific data structure of the information code, wherein the data structure of the information code provided in an embodiment of the invention is {Id, CodeKeyword, CodeType, CodePath, Pid}, wherein Id is a unique identifier of the information code, CodeKeyword is a code keyword which is node information corresponding to the child node, CodeType is a dimension name, CodePath is a code path which is a branch path of the child node, and Pid is a parent node of the child node. It should be noted that there may be at least one child node contained in the branch path, and the code path may be either a branch path or a partial path in the branch path containing multiple levels of nodes.

secondly, acquiring field information of each field corresponding to the data structure of the information code for each child node in various dimension level trees; taking the court level tree in FIG. 3 as an example, with regard to the information code of the first grass-roots court, required field information is as follows: id is a first basic level court, CodeKeyword is the first grass-roots court, CodeType is a court, CodePath is the first intermediate court-first grass-roots court, Pid is the first intermediate court, so the information code for this node can be shown as {first basic level court, first grass-roots court, court, first intermediate court-first grass-roots court, first intermediate court}; and among the seven nodes included in the level tree in FIG. 3, except the root node "superior court", the other six nodes will each generate one information code;

and thirdly, generating an information code corresponding to each child node layer by layer according to an order from a top layer to a bottom layer of the dimension level tree; in the embodiment of the invention, the information code is generated for each child node one by one from left to right in the same layer and from the root node to the child nodes.

It should be noted that the information code obtained for the second grass-roots court node in FIG. 3 is {second basic level court, second grass-roots court, court, first intermediate court/second intermediate court-the, first grass-roots court, first intermediate court/second intermediate court}, multiple parent nodes exist in this node, that is, a corresponding relation between the parent nodes and the child nodes in the information code can be many to many.

Figure 4:
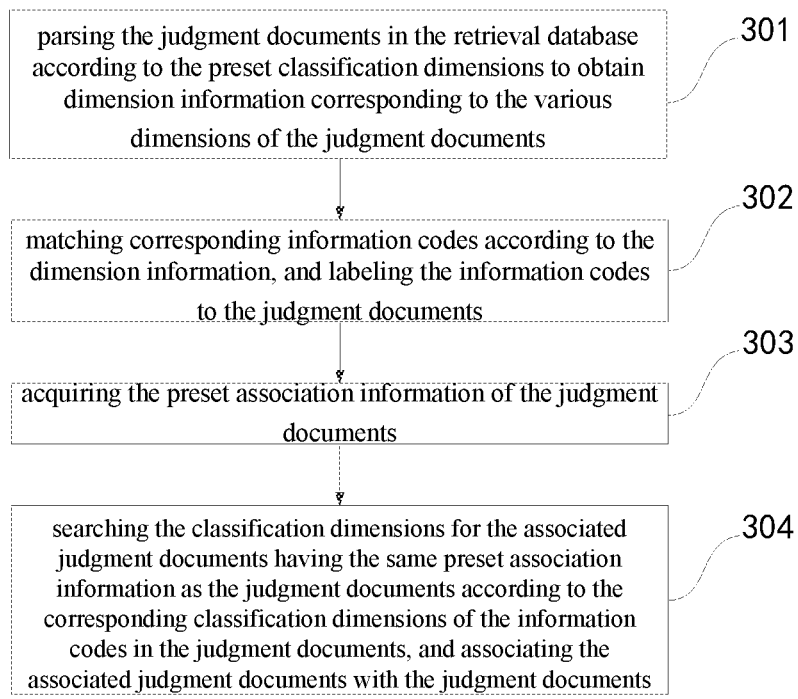
FIG. 4 shows a flow chart of performing information code marking operation on a judgment document and performing association operation using association information provided by an embodiment of the invention.

203. storing the generated information codes in a dictionary form to obtain an information code dictionary;

the information codes in the information code dictionary are stored in the form of key-value pair, a key is a dimension-keyword, namely, CodeType_CodeKeyword, and a value is a structure object of the information code; in this way, according to a key value matched in the judgment document in the retrieval database, the structure object corresponding to the information code can be searched in the information code dictionary, and then the judgment document is marked with the information code; and next, after completing the above-mentioned operation of establishing the information code and the information code dictionary, operations of labeling the judgment documents with the information code and associating the judgment documents in the retrieval database are performed, as shown in FIG. 4, specifically including:

301. parsing the judgment documents in the retrieval database according to the preset classification dimensions to obtain dimension information corresponding to the various dimensions of the judgment documents;

in this step, parsing of the judgment documents can be implemented by a document parser, which will parse the dimension information contained in the judgment document under each dimension according to the set classification dimension, wherein the classification dimension corresponds to the classification dimension set when the information code is created;

one form of parsing of the dimension information is dimension-keyword, CodeType_CodeKeyword, for example, court-second intermediate court, trial level-second instance, etc.; and the main purpose of the parsed dimension information is to obtain key values of the information codes in the information code dictionary so as to match the corresponding information codes in the information code dictionary for the judgment documents;

302. matching corresponding information codes according to the dimension information, and labeling the information codes in the judgment documents;

according to the format of the key values in the information code dictionary, corresponding field contents are extracted from the dimension information and combined into a key value of the judgment document. This key value is compared with the key values in the information code dictionary, and the information code corresponding to this key value is marked in the judgment document when the same key value exists. In general, according to the set number of dimensions, a judgment document can be marked with the corresponding number of information codes, these information codes are saved in an array field corresponding to the judgment document, and the array field is stored in a parsing database; and through data recorded in the parsing database, it is possible to quickly match the judgment documents containing the information codes for the user, that is, vertical retrieval is performed;

303. acquiring the preset association information of the judgment documents;

at the beginning of this step, the judgment documents marked with the information codes in the retrieval database are horizontally associated; while the basis of association is association information which is preset. In the embodiment of the invention, the association information can be different judgment documents with the same case number, for example, different judgment documents obtained after trials in different courts for the same case, or different judgment documents obtained under different trial levels (a judgment document of a first instance and a judgment document of a second instance);

304. searching the classification dimensions for the associated judgment documents having the same preset association information as the judgment documents according to the corresponding classification dimensions of the information codes in the judgment documents, and associating the associated judgment documents with the judgment documents; specifically, the association can be performed according to the CodePath in a code information object; when the judgment documents are classified according to the information codes, the judgment documents having the same association information, i.e., different judgment documents with the same case number, will surely be distributed in nodes at different levels in the dimension level tree corresponding to different classification dimensions, and the various nodes have a indirect subordinate relation; therefore, according to this feature, the associated judgment documents can be stored in the form of a dictionary, wherein a key is a dimension-code path (CodeType_CodePath) and a value is an array of judgment document names; the dictionary is also stored in the parsing database; in this way, the corresponding information codes are parsed according to the retrieval conditions inputted by the user, and the judgment documents having the same association information can be quickly matched according to the dictionary stored in the parsing database through the dimension information and code path information in the information codes, that is, the horizontal retrieval is performed; and after the above-mentioned information code marking and association processing on the judgment documents in the retrieval database, the user can perform judgment document retrieval based on the retrieval database, so that horizontal retrieval results and vertical retrieval results which are different are obtained; for example, after the retrieval conditions inputted by the user are parsed, a name of the obtained information code is "a first basic level court" and then an object of the information code is {first basic level court, first grass-roots court, court, first intermediate court-first grass-roots court, first intermediate court}, and the retrieval results correspondingly obtained are as shown in the tables below:

TABLE 1

Schematic Diagram of Vertical Retrieval Results
Judgment documents of the first grass-roots court First instance of Case 1
Retrial of Case 1
First instance of Case 2
First instance of Case 3

TABLE 2

Schematic Diagram of Horizontal Retrieval Results
Associated judgment documents

Figure 5:
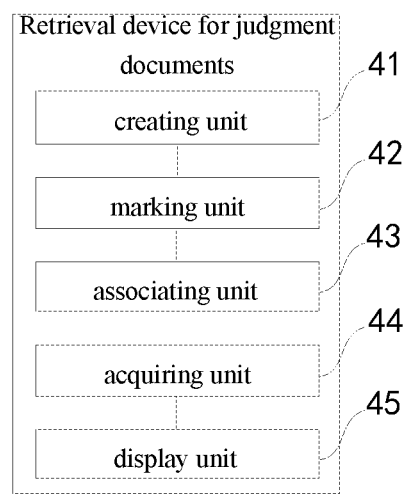
FIG. 5 is a block diagram showing composition of a retrieval device for judgment documents provided by an embodiment of the invention.

First instance of Case 1 by the first intermediate court
Retrial of Case 1 by the first intermediate court
First instance of Case 1 by the superior court
First instance of Case 2 by the first intermediate court Further, as an implementation of the above-mentioned method, an embodiment of the invention provides a retrieval device for judgment documents. The embodiment of the retrieval device corresponds to the embodiment of the above-mentioned retrieval method. In order to facilitate reading, the embodiment of the retrieval device will not repeat the details of the embodiment of the above-mentioned retrieval method one by one, but it should be clear that the retrieval device in this embodiment can correspondingly implement all the contents of the embodiment of the above-mentioned retrieval method. The retrieval device is mainly applied for judgment document data and corresponding retrieval engines to realize judgment document matching with regard to retrieval information inputted by the user, specifically as shown in FIG. 5. The retrieval device includes:

a creating unit 41 configured for creating information codes, wherein the information codes are atomic data structures extracted from judgment documents according to preset classification dimensions and are configured for distinguishing and associating different judgment documents;

a marking unit 42 configured for marking judgment documents in a retrieval database with the information codes created by the creating unit 41;

an associating unit 43 configured for associating the judgment documents marked with the information codes by the marking unit 42 according to preset association information;

an acquiring unit 44 configured for acquiring corresponding information codes in retrieval information; and a display unit 45 configured for, according to the information codes acquired by the acquiring unit 44, outputting and displaying the judgment documents marked with the information codes and judgment documents associated with the judgment documents marked with the information codes as retrieval results.

Figure 6:
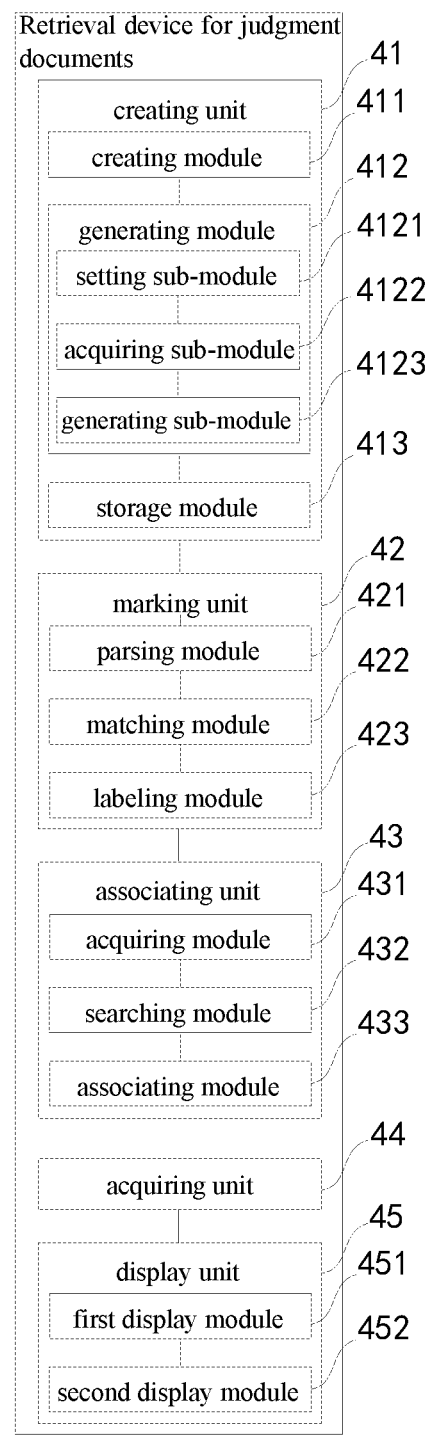
FIG. 6 is a block diagram showing composition of another retrieval device for judgment documents provided by an embodiment of the invention.

Further, as shown in FIG. 6, the creating unit 41 includes:
a creating module 411 configured for creating a dimension level tree according to the preset classification dimensions, wherein the classification dimensions are configured for classifying the judgment documents;

a generating module 412 configured for generating corresponding information codes in accordance with child nodes in the dimension level tree according to a structure of the dimension level tree created by the creating module 411; and a storage module 413 configured for storing the information codes generated by the generating module 412 in a dictionary form to obtain an information code dictionary.

Further, as shown in FIG. 6, the generating module 412 includes:

a setting sub-module 4121 configured for setting a structure of the information code as {Id,CodeKeyword,CodeType,CodePath,Pid}, wherein Id is a unique identifier of the information code, CodeKeyword is a code keyword which is node information corresponding to the child node, CodeType is a dimension name, CodePath is a code path which is a branch path of the child node, and Pid is a parent node of the child node;

an acquiring sub-module 4122 configured for acquiring field information of each field corresponding to the structure, set by the setting sub-module 4121, of the information code for each child node; and a generating sub-module 4123 configured for generating an information code corresponding to each child node layer by layer according to an order from a top layer to a bottom layer of the dimension level tree and the field information, acquired by the acquiring sub-module 4122, of each field in the structure of the information code corresponding to each child node.

Further, the storage module 413 is further configured so that the information code in the dictionary form has a key being CodeType_CodeKeyword and a value being a structure object of the information code.

Further, as shown in FIG. 6, the associating unit 43 includes:

an acquiring module 431 configured for acquiring the preset association information of the judgment documents;

a searching module 432 configured for searching judgment documents corresponding to other nodes in branch paths to which the code paths belong according to code paths of the information codes in the judgment documents, and acquiring associated judgment documents having the same preset association information, acquired by the acquiring module 431, as the judgment documents from the corresponding judgment documents; and an associating module 433 configured for associating the associated judgment documents obtained by the searching module 432 with the judgment documents.

Further, as shown in FIG. 6, the marking unit 42 includes:
a parsing module 421 configured for parsing the judgment documents in the retrieval database according to the preset classification dimensions to obtain dimension information corresponding to the various dimensions of the judgment documents;
a matching module 422 configured for matching corresponding information codes according to the dimension information obtained through parsing by the parsing module 421; and
a labeling module 423 configured for labeling the information codes obtained by the matching module 422 to the judgment documents.

Further, the associating unit 43 includes:
the acquiring module further configured for acquiring the preset association information of the judgment documents;
the searching module further configured for searching the classification dimensions for the associated judgment documents having the same preset association information as the judgment documents according to the classification dimensions of the information codes in the judgment documents; and
the associating module further configured for associating the associated judgment documents with the judgment documents.

Further, as shown in FIG. 6, the display unit 45 includes:
a first display module 451 configured for extracting the judgment documents marked with the information codes and displaying the judgment documents in a first retrieval list; and
a second display module 452 configured for, according to the judgment documents in the first retrieval list displayed by the first display module 451, extracting the judgment documents having the same association information as the judgment documents and displaying the judgment documents having the same association information as the judgment documents in a second retrieval list.

To sum up, according to the retrieval method and device for judgment documents adopted by the embodiment of the invention, through association processing on the judgment documents in a judgment document base, when a user retrieves the judgment documents, the user not only can match vertical retrieval results according to input retrieval conditions, that is, the judgment documents marked with the retrieved information codes, but also obtain the judgment documents horizontally associated with the retrieval conditions, that is, the associated judgment documents at the same latitude and at different levels as the retrieved information codes, so that the retrieval results are more comprehensive, intelligence of retrieval is improved, the requirement on the retrieval capability of the user is lowered, and the user can quickly and accurately obtain the required retrieval results with simplified query conditions.

The retrieval device for the judgment documents includes a processor and a memory, wherein the creating unit, the marking unit, the associating unit, the acquiring unit, the display unit and the like are stored in the memory as program units, and the processor executes the program units stored in the memory to realize corresponding functions.

The processor includes one or more core which call the corresponding program units from the memory. Marking the existing judgment documents with the information codes is realized by adjusting parameters of the cores; and vertical and horizontal retrieval is performed according to the association relation among the information codes during retrieval so as to provide more comprehensive retrieval results.

The memory may include a non-permanent memory in a computer readable medium, and a random access memory (RAM) and/or non-volatile memory and other forms, such as a read-only memory (ROM) or a flash memory (flash RAM); and the memory includes at least one memory chip.

The application also provides a computer program product. When being executed on data processing equipment, the computer program product is adapted to execute initialization of a program code according to the method including the following steps of: creating information codes, wherein the information codes are atomic data structures extracted from judgment documents according to preset classification dimensions and are configured for distinguishing and associating different judgment documents; marking judgment documents in a retrieval database with the information codes; associating the judgment documents marked with the information code according to preset association information; acquiring corresponding information codes in retrieval information; and outputting and displaying the judgment documents marked with the information codes and judgment documents associated with the judgment documents marked with the information codes as retrieval results according to the information codes.

Those skilled in the art will appreciate that embodiments of the application may be provided as a method, system, or computer program product. Therefore, the application may take the form of an entirely hardware embodiment, an entirely software embodiment, or an embodiment combining software and hardware. Moreover, the application may take the form of a computer program product implemented on one or more computer available storage media (including, but not limited to, magnetic disk memories, CD-ROM, optical memories, etc.) having computer available program codes embodied therein.

The application is described with reference to flow charts and/or block diagrams of a method, apparatus (system), and computer program product according to an embodiment of the application. It should be understood that each flow and/or block in the flow charts and/or block diagrams, and combinations of the flows and/or blocks in the flow charts and/or block diagrams may be implemented by computer program instructions. These computer program instructions may be provided to a processor of a general purpose computer, a special-purpose computer, an embedded processor, or other programmable data processing equipment to produce a machine, such that instructions executed by the processor of the computer or other programmable data processing equipment produce a device for implementing the functions specified in one or more flows in a flow chart and/or one or more blocks in a block diagram.

These computer program instructions may also be stored in a computer-readable memory that can direct a computer or other programmable data processing equipment to operate in a particular manner, such that the instructions stored in the computer-readable memory produce an manufacture article including an instruction device that implements the functions specified in one or more flows in the flow chart and/or one or more blocks in the block diagram.

These computer program instructions may also be loaded onto a computer or other programmable data processing equipment such that a series of operational steps are performed on the computer or other programmable equipment to produce computer implemented processing, and the instructions executed on the computer or other programmable equipment provide steps for implementing the functions specified in one or more flows in the flow chart and/or one or more blocks in the block diagram.

In a typical configuration, a computing device includes one or more processors (CPU), input/output interfaces, network interfaces, and internal storages.

The memory may include a non-permanent memory in a computer readable medium, and a random access memory (RAM) and/or non-volatile memory and other forms, such as a read-only memory (ROM) or a flash memory (flash RAM). The memory is an example of computer readable media.

The computer readable media includes permanent and non-permanent, and removable and non-removable media and information storage can be implemented by any method or technology. Information may be computer readable instructions, data structures, modules of programs, or other data. Examples of storage media of the computer include, but are not limited to, a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital video disk (DVD) or other optical memories magnetic cassette tapes, and magnetic tape disk memories or other magnetic memory devices or any other non-transmission medium, which can be used for storing information that can be accessed by the computing device. As defined herein, the computer readable medium does not include temporary storage computer readable media (transitory media) such as modulated data signals and carrier waves.

It is further noted that the terms "comprising", "having" or any other variations are intended to cover non-exclusive inclusion, so that a process, method, article, or device that comprises a list of elements is not necessarily limited to only those elements but may include other elements not expressly listed or inherent to such process, method, article, or device. In the absence of more specific situations, an element defined by the statement "comprising a" does not exclude any other identical elements existing in the process, method, article, or device comprising the element.

Those skilled in the art will appreciate that embodiments of the application may be provided as a method, system, or computer program product. Therefore, the application may take the form of an entirely hardware embodiment, an entirely software embodiment, or an embodiment combining software and hardware. Moreover, the application may take the form of a computer program product implemented on one or more computer available storage media (including, but not limited to, magnetic disk memories, CD-ROM, optical memories, etc.) having computer available program codes embodied therein.

The embodiments are only preferred embodiments of the application, but not limit thereto. For a person skilled in the art, various variations and changes can be made to the application. Any modification, equivalent replacement and improvement made within the spirit and rule of the application shall be incorporated in the protection scope of the application.

What is claimed is:

1. A computer implemented retrieval method comprising a hardware processor for judgment documents, the method comprising the steps of:

creating information codes, wherein the information codes are atomic data structures extracted from the judgment documents according to preset classification dimensions and are configured for distinguishing and associating different judgment documents;

marking the judgment documents in a retrieval database with the information codes;

associating the judgment documents marked with the information codes according to preset association information;

acquiring corresponding information codes in retrieval request; and outputting and displaying the judgment documents marked with the information codes and judgment documents associated with the judgment documents marked with the information codes as retrieval results according to the information codes;

wherein the creating the information codes comprises:

creating a dimension level tree according to the preset classification dimensions, wherein the classification dimensions are configured for classifying the judgment documents;

generating corresponding information codes in accordance with child nodes in the dimension level tree according to a structure of the dimension level tree; and storing the information codes in a dictionary form to obtain an information code dictionary;

wherein the generating the corresponding information codes in accordance with the child nodes in the dimension level tree according to the structure of the dimension level tree comprises:

setting a structure of the information code as {Id,CodeKeyword,CodeType,CodePath,Pid}, wherein Id is a unique identifier of the information code, CodeKeyword is a code keyword which is node information corresponding to the child node, CodeType is a dimension name, CodePath is a code path which is a branch path of the child node, and Pid is a parent node of the child node;

acquiring field information of each field corresponding to the structure of the information code for each child node; and generating an information code corresponding to each child node layer by layer according to an order from a top layer to a bottom layer of the dimension level tree and the field information of each field in the structure of the information code corresponding to each child node.

2. The retrieval method of claim 1, wherein the storing the information codes in the dictionary form comprises:

the information code in the dictionary form has a key being CodeType_CodeKeyword and a value being a structure object of the information code.

3. The retrieval method of claim 2, wherein the associating the judgment documents marked with the information codes according to the preset association information comprises:
acquiring the preset association information of the judgment documents;
searching judgment documents corresponding to other nodes in branch paths to which the code paths belong according to code paths of the information codes in the judgment documents;
acquiring associated judgment documents having the same preset association information as the judgment documents from the corresponding judgment documents; and
associating the associated judgment documents with the judgment documents.

4. The retrieval method of claim 1, wherein the marking the judgment documents in the retrieval database with the information codes comprises:
parsing the judgment documents in the retrieval database according to the preset classification dimensions to obtain dimension information corresponding to the various dimensions of the judgment documents;
matching corresponding information codes according to the dimension information; and
labeling the information codes to the judgment documents.

5. The retrieval method of claim 1, wherein the associating the judgment documents marked with the information codes according to the preset association information comprises:
acquiring the preset association information of the judgment documents;
searching the classification dimensions for the associated judgment documents having the same preset association information as the judgment documents according to the classification dimensions of the information codes in the judgment documents; and
associating the associated judgment documents with the judgment documents.

6. The retrieval method of claim 1, wherein the outputting and displaying the judgment documents marked with the information codes and judgment documents associated with the judgment documents marked with the information codes as retrieval results according to the information codes comprises:
extracting the judgment documents marked with the information codes and displaying the judgment documents in a first retrieval list; and
extracting the judgment documents having the same association information as the judgment documents according to the judgment documents in the first retrieval list and displaying the judgment documents having the same association information as the judgment documents in a second retrieval list.

7. A retrieval device for judgment documents, comprising a hardware processor coupled with a memory and configured to execute program units stored on the memory, wherein the program units comprising:
a creating unit configured for creating information codes, wherein the information codes are atomic data structures extracted from judgment documents according to preset classification dimensions and are configured for distinguishing and associating different judgment documents;
a marking unit configured for marking judgment documents in a retrieval database with the information codes created by the creating unit;
an associating unit configured for associating the judgment documents marked with the information codes by the marking unit according to preset association information;
an acquiring unit configured for acquiring corresponding information codes in retrieval request; and
a display unit configured for outputting and displaying the judgment documents marked with the information codes and judgment documents associated with the judgment documents marked with the information codes as retrieval results according to the information codes acquired by the acquiring unit;
wherein the creating unit comprises:
a creating module configured for creating a dimension level tree according to the preset classification dimensions, wherein the classification dimensions are configured for classifying the judgment documents;
a generating module configured for generating corresponding information codes in accordance with child nodes in the dimension level tree according to a structure of the dimension level tree created by the creating module; and
a storage module configured for storing the information codes generated by the generating module in a dictionary form to obtain an information code dictionary;
the generating module includes:
a setting sub-module configured for setting a structure of the information code as {Id, CodeKeyword, CodeType, CodePath, Pid}, wherein Id is a unique identifier of the information code, CodeKeyword is a code keyword which is node information corresponding to the child node, CodeType is a dimension name, CodePath is a code path which is a branch path of the child node, and Pid is a parent node of the child node;
an acquiring sub-module configured for acquiring field information of each field corresponding to the structure, set by the setting sub-module, of the information code for each child node; and
a generating sub-module configured for generating an information code corresponding to each child node layer by layer according to an order from a top layer to a bottom layer of the dimension level tree and the field information, acquired by the acquiring sub-module, of each field in the structure of the information code corresponding to each child node.

* * * * *